United States Patent [19]

Uehara et al.

[11] Patent Number: 5,428,110

[45] Date of Patent: Jun. 27, 1995

[54] PROCESS FOR PRODUCING PROPYLENE COPOLYMER

[75] Inventors: Yumito Uehara; Hideshige Kato; Hidehito Kato; Kouzou Kitayama, all of Okayama, Japan

[73] Assignee: Mitsubishi Kasei Corporation, Tokyo, Japan

[21] Appl. No.: 170,996

[22] Filed: Dec. 21, 1993

Related U.S. Application Data

[63] Continuation of Ser. No. 704,249, May 22, 1991, abandoned.

[30] Foreign Application Priority Data

| May 22, 1990 | [JP] | Japan | 2-132382 |
| Jul. 11, 1990 | [JP] | Japan | 2-183812 |
| Jul. 11, 1990 | [JP] | Japan | 2-183813 |

[51] Int. Cl.6 ............................................ C08F 297/08
[52] U.S. Cl. .................................. 525/247; 525/53; 525/266; 525/268; 525/270; 525/322; 525/323
[58] Field of Search ............... 525/247, 266, 270, 322, 525/323, 53; 526/65

[56] References Cited

U.S. PATENT DOCUMENTS

| 4,483,966 | 11/1984 | Suzuki et al. | 525/323 |
| 4,547,552 | 10/1985 | Toyota et al. | 525/247 |
| 4,739,015 | 4/1988 | Toyota et al. | 525/247 |
| 4,820,775 | 4/1989 | Shiga et al. | 525/270 |

Primary Examiner—Romulo H. Delmendo
Attorney, Agent, or Firm—Sughrue, Mion, Zinn, Macpeak & Seas

[57] ABSTRACT

A process for producing a copolymer of propylene and other $\alpha$-olefins in the presence of a catalyst comprising a titanium-containing solid catalyst component and an organoaluminum compound is disclosed. The process comprises (1) a first step in which propylene is homopolymerized or propylene and a minor proportion of other $\alpha$-olefin are copolymerized to prepare polymer particles having a pore volume of from 0.15 to 0.30 cm$^3$/g, and (2) a second step in which propylene and other $\alpha$-olefin are copolymerized in the presence of said polymer particles. The resulting propylene copolymer particles have improved fluidity and high bulk density.

8 Claims, No Drawings

PROCESS FOR PRODUCING PROPYLENE COPOLYMER

This is a Continuation of application Ser. No. 07/704,249 filed May 22, 1991, now abandoned.

FIELD OF THE INVENTION

The present invention relates to a process for producing a propylene copolymer, and more particularly to a process for producing a propylene copolymer having excellent powder properties where the powder particles do not adhere to each other and to the inner wall of a reaction vessel and which cause no obstruction in piping in subsequent steps or no caking in a silo, a hopper, etc.

BACKGROUND OF THE INVENTION

Propylene polymers are obtained by homopolymerization of propylene or copolymerization of propylene and other olefins in the presence of a so-called Ziegler-Natta catalyst mainly composed of a solid catalyst component containing titanium and an organoaluminum compound. Known polymerization techniques include polymerization in the presence of an inert hydrocarbon solvent, polymerization in liquefied propylene, and polymerization in a gaseous phase in the substantial absence of an inert solvent or liquefied propylene.

However, in the production of propylene-olefin random or block copolymers, a considerably large proportion of amorphous polymers is by-produced, and the resulting polymer particles have poor fluidity and a reduced bulk density due to their surface tackiness. In an extreme case, the particles adhere to various equipment such as a reaction vessel and a hopper, stop flowing due to bridging, or undergo agglomeration or caking.

The production of propylene polymers, especially random or block copolymers, has thus been under restrictions arising from the above-described poor powder properties such that the copolymerization ratio of other olefins (the amount of other olefins in the copolymer) should be limited. The gaseous polymerization method is considered to slightly alleviate such disadvantages but is still unsatisfactory.

Furthermore, in the production of block copolymers, adhesion of polymer particles to the inner wall of reactors and caking of the particles not only are a great hinderance to stable operation but deteriorate the product quality.

SUMMARY OF THE INVENTION

The present inventors have conducted extensive investigations on means for preventing adhesion of particles to equipment and deterioration of powder properties. As a result, it has now been found that propylene and other $\alpha$-olefins are copolyerized in the presence of a propylene polymer having specific characteristics to give copolymer particles having markedly improved powder properties.

An object of the present invention is therefore to provided a process for producing a propylene copolymer having excellent powder properties where the powder particles do not adhere to each other and to the inner wall of a reaction vessel and which cause no obstruction in piping in subsequent steps or no caking in a silo, a hopper, etc.

Other objects and effects of the present invention will be apparent from the following description.

The present invention relates to a process for producing a copolymer of propylene and other $\alpha$-olefins in the presence of a catalyst comprising a titanium-containing solid catalyst component and an organoaluminum compound, the process comprising (1) a first step in which propylene is homopolymerized or propylene and minor proportions of other $\alpha$-olefins are copolymerized to prepare polymer particles having a pore volume of from 0.15 to 0.30 cm$^3$/g and, (2) a second step in which propylene and other $\alpha$-olefins are copolymerized in the presence of the polymer particles.

The terminology "propylene copolymer" as used herein inclusively means random and block copolymers of propylene and other $\alpha$-olefins.

The terminology "pore volume" as used herein means an internal pore volume. A volume of both internal and external pores is measured by a mercury penetration method, and a cumulative pore volume is plotted as an ordinate, and a pore size as an abscissa, to obtain a pore volume distribution curve. The region up to the steep rise of the cumulative pore volume represents internal pore volume which is distinguished from external pore volume. The cumulative volume up to the rise is taken as an internal pore volume.

DETAILED DESCRIPTION OF THE INVENTION

The polymerization catalyst which can be used in the present invention is a stereospecific catalyst system comprising a titanium-containing solid catalyst component and an organoaluminum compound.

Examples of the titanium-containing solid catalyst components include catalyst components mainly composed of titanium trichloride, and catalyst-on-carrier types containing a solid magnesium compound, a titanium compound component and a halogen component.

As the component mainly composed of titanium trichloride, known titanium trichloride species can be used. Examples of known titanium trichloride species include one activated by grinding in a ball mill; one obtained by solvent extraction of the above-described activated titanium trichloride; one obtained by treating $\beta$-type titanium trichloride with a complexing agent, e.g., ethers, and then with titanium tetrachloride so as to have an Al/Ti atomic ratio of not more than 0.15; and one obtained by treating titanium tetrachloride with an organoaluminum compound in the presence of an ether or a thioether and heating the resulting liquefied product at 150° C. or less to precipitate a solid having an Al/Ti atomic ratio of not more than 0.15.

Of these titanium trichloride species, particularly preferred are those having an Al/Ti atomic ratio of not more than 0.15, more preferably not more than 0.1, and most preferably not more than 0.02, and containing a complexing agent such as ethers in an amount of 0.001 mol or more, preferably 0.01 mol or more, per mol of titanium trichloride.

Specific examples of processes for preparing these titanium trichloride species are described in JP-B-55-8452, JP-B-55-8451, JP-B-55-8003, JP-B-54-41040, JP-B-55-8931, JP-A-58-36928, JP-A-59-12905, and JP-A-59-13630. (The term "JP-B" as used herein means an "examined published Japanese patent application", and the term "JP-A" as used herein means an "unexamined published Japanese patent application".)

While the above-described catalyst system may be used as it is, it is preferred that the catalyst system composed of a titanium-containing solid catalyst and an organoaluminum compound is pretreated by preliminary polymerization of a small amount of an α-olefin so as to be in the form of an α-olefin polymer-containing catalyst component.

The pretreatment can be carried out by adding a titanium-containing solid catalyst component and an organoaluminum compound to an inert solvent, e.g., hexane and heptane, and supplying thereto an α-olefin, e.g., propylene, ethylene and 1-butene or a mixture thereof, to conduct polymerization. The α-olefin used in preliminary polymerization may be the same as or different from the α-olefin used as a component of the copolymer of the present invention. Conditions known for general pretreatment called preliminary polymerization (as described, e.g., in U.S. Pat. Nos. 3,893,989 and 4,200,717, JP-B-52-39871, JP-B-54-30016, JP-B-44-4992 and JP-B-56-22816) can be applied. The higher the rate of polymerization per unit weight of the solid catalyst component, the better. From the consideration of apparatus and economy, however, the amount of preliminary polymer produced per gram of the solid catalyst component is generally controlled to range from 0.1 to 100 g, and preferably from 0.2 to 30 g. A molecular weight regulator, e.g., hydrogen, may be added to the polymerization system. The preliminary polymerization is preferably conducted uniformly in a batch system. The preliminary polymerization of the catalyst is effective to improve properties of the resulting polymer, such as bulk density.

The polymerization of the first step according to the present invention is carried out by using the above-mentioned catalyst system composed of a titanium-containing solid catalyst component and an organoaluminum compound and, if desired, an additive (third component) for improving stereospecificity.

The organoaluminum compound which is used as a co-catalyst is represented by formula $AlR^1_mX_{3-m}$, wherein $R^1$ represents a hydrocarbon group having from 1 to 20 carbon atoms, X represents a halogen atom, and m represents a number of more than 1.5 and not more than 3. In using a catalyst-on-carrier containing a solid magnesium compound as a titanium-containing solid catalyst component, it is preferred to use $AlR^1_3$ or a mixture of $AlR^1_3$ and $AlR^1_2X$ as an organoaluminum compound. In using a titanium-containing solid catalyst component mainly composed of titanium trichloride, $AlR^1_2X$ is preferably used, and more preferably diethylaluminum chloride, di-n-propylaluminum chloride, dihexylaluminum chloride and di-n-octylaluminum chloride are used.

The titanium-containing solid catalyst component and organoaluminum compound are generally used at a molar ratio of the organoaluminum compound to the titanium of from 1 to 300, and preferably from 2 to 150.

The third component which may be used for improving stereospecificity includes various electron-donating compounds such as N, O, P, Si, etc., and hydrocarbon compounds. The third component is generally added in an amount of from 0.001 to 100 mols, and preferably from 0.01 to 50 mols, per mol of titanium.

Examples of the electron-donating compounds include compounds containing at least one electron-donating atom or group, such as ethers, polyethers, alkylene oxides, furans, amines, trialkylphosphines, triarylphosphines, pyridines, quinolines, phosphoric esters, phosphoric acid amides, phosphine oxide, trialkyl phosphites, triaryl phosphites, ketones, carboxylic acid esters, and carboxylic acid amides. Preferred of them are carboxylic acid esters, e.g., ethyl benzoate, methyl benzoate, phenyl acetate, and methyl methacrylate; glycine esters, e.g., dimethylglycine ethyl ester and dimethylglycine phenyl ester; and triaryl phosphites, e.g., triphenyl phosphite and trinonylphenyl phosphite.

Aromatic hydrocarbons, such as benzene, toluene, and xylene, can also be used as the third component.

Polymerization processes commonly employed for propylene can be applied to the first step. For example, polymerization is performed in a liquid phase in the presence of an inert hydrocarbon and liquefied propylene, etc., or in a gaseous phase in the substantial absence of these liquid phases. In the first step, propylene is homopolymerized or random-copolymerized with a minor proportion of other α-olefins. The other α-olefins may be used in the first step in such an amount that the resulting polymer does not lose the characteristics of polypropylene polymers. For example, it is generally used in an amount of 10 wt % or less, preferably 5 wt % or less, based on the amount of propylene.

The most significant technical feature of the present invention consists in that the propylene homopolymer or propylene-α-olefin copolymer produced in the first step has a specific pore volume whereby powder properties of the resulting propylene copolymer are improved so as to prevent polymer particles from adhering to each other and to the inner wall of the reaction vessel, obstructing piping, and caking in a silo, a hopper, etc.

The pore volume of the propylene homopolymer or copolymer obtained in the first step ranges from 0.15 to 0.3 $cm^3/g$, and preferably from 0.18 to 0.3 $cm^3/g$. If it is less than 0.15 $cm^3/g$, the effects of improving powder properties are small. If it exceeds 0.3 $cm^3/g$, powder properties such as bulk density are reduced.

Methods for controlling the pore volume to the above-recited range include a method of controlling conditions of the above-described preliminary polymerization such as temperature and a method comprising previously treating the solid catalyst component by contact with a trace amount of an active hydrogen compound or oxygen.

A suitable preliminary polymerization temperature varies depending on other conditions such as the kind of the catalyst components used and feed rates. In general, the lower the temperature, the smaller the pore volume.

The contact treatment with an active hydrogen compound is usually carried out in a slurry state in an inert hydrocarbon solvent, such as aliphatic hydrocarbons, alicyclic hydrocarbons, and aromatic hydrocarbons. The contact temperature and time are appropriately and arbitrarily selected and generally range from 0° to 100° C. in temperature and from 5 minutes to 5 hours in time.

In the case where the preliminary polymerization is carried out, the contact treatment may be conducted before or after the preliminary polymerization. The control of the contact treatment is easier if the contact treatment is conducted after the preliminary polymerization.

The active hydrogen compound is generally used at a molar ratio to Ti of from about 0.0001 to about 0.1, and preferably from about 0.001 to about 0.05. The effect of improving powder properties is insufficient at a lower molar ratio. If the molar ratio exceeds the upper limit, unfavorable phenomena such as a reduction in polymerization activity and a reduction in stereospecificity tend to result.

Examples of the active hydrogen compounds include water, alcohols, carboxylic acids, sulfonic acids, and amines. Specific examples of these active hydrogen compounds are alcohols, e.g., methanol, ethanol, propanol, butanol, hexanol, ethylene glycol, propylene glycol, diethylene glycol, cyclohexanol, and benzyl alcohol; phenolic compounds, e.g., phenol and cresol; carboxylic acids, e.g., formic acid, acetic acid, propionic acid, butyric acid, acrylic acid, benzoic acid, salicylic acid, and stearic acid; sulfonic acids, e.g., methanesulfonic acid, ethanesulfonic acid, benzenesulfonic acid, and toluenesulfonic acids; and amines, e.g., methylamine, ethylamine, dimethylamine, and diethylamine. Preferred of them are water and alcohols.

The contact treatment with oxygen is usually carried out in a slurry state in an inert hydrocarbon solvent, such as aliphatic hydrocarbons, alicyclic hydrocarbons, and aromatic hydrocarbons. Methods for supplying oxygen are not particularly restricted as far as the amount of reaction may be controllable. For example, oxygen can be supplied by addition of an inert hydrocarbon solvent saturated with dried oxygen or air. The contact temperature and time are appropriately and arbitrarily selected and generally range from 0° to 100° C. in temperature and from 5 minutes to 5 hours in time.

Oxygen is generally used at a molar ratio to Ti of from about 0.0001 to about 0.1, and preferably from about 0.001 to about 0.05. The effect of improving powder properties is insufficient at a lower molar ratio. If the molar ratio exceeds the upper limit, unfavorable phenomena such as a reduction in polymerization activity and a reduction in stereospecificity tend to result.

In the second step of the present invention, (a) the polymerization of an α-olefin other than propylene or, (b) the copolymerization of propylene and an α-olefin other than propylene is successively conducted in the presence of the propylene homopolymer or copolymer produced in the first step while keeping the activity of the catalyst system used in the first step. Examples of the other α-olefin include α-olefin having 8 or less carbon atoms. Ethylene is particularly preferred as the other α-olefin to be copolymerized. Terpolymers, such as a propylene-ethylene-butene terpolymer, are included in the copolymer of the present invention.

Similarly to the first step, polymerization in the second step may be conducted by slurry polymerization, gaseous polymerization or the like technique, but gaseous polymerization is preferred.

Reaction vessels to be used in gaseous polymerization include a fluidized vessel in which polymer particles containing catalyst components are made to flow by a gaseous monomer(s) or a gas containing a gaseous monomer(s), which may be equipped with stirring blades for smoothening mixing of polymer particles. The polymerization may be conducted either in a batch system or in a continuous system. The polymerization pressure is generally from 1 to 100 atm., and preferably from 5 to 40 atm., and the polymerization temperature is generally from 50° to 90° C., and preferably from 60° to 80° C.

The molecular weight of the polymer produced may be controlled by addition of a known molecular weight regulator, e.g., hydrogen and diethylzinc.

Where the polymerization of the second step is effected in a gaseous phase, the proportion of propylene in the total monomers (propylene+other α-olefin) in the gaseous phase preferably ranges from 30 to 95 mol %.

The amount of the polymer produced in the second step is generally from 3 to 50 wt %, preferably from 5 to 40 wt %, based on the total amount of the copolymer produced.

The present invention is now illustrated in greater detail by way of Examples, but it should be understood that the present invention is not deemed to be limited thereto. All the percents, parts and ratios are by weight unless otherwise indicated.

The bulk density and the pore volume of the polymers obtained were determined by the following methods.

1) Bulk Density:

The bulk density was measured according to JIS K6721.

2) Pore Volume:

A mercury penetration method was followed using a mercury porosimeter, "Autopore 9200" manufactured by Shimadzu Corporation, Japan, at a penetration pressure of from 0.5 to 53,330 psia.

EXAMPLE 1

(A)

Preparation of Solid Titanium Trichloride Catalyst Complex

In a 10 l-volume autoclave whose atmosphere had been thoroughly displaced with nitrogen were charged 5.0 l of purified toluene and 5.0 mol of titanium tetrachloride, and 5.0 mol of di-n-butyl ether was added thereto. To the mixture was added dropwise 2.38 mols of diethylaluminum chloride while maintaining the mixture at 25° to 30° C. under stirring to form a black brown uniform solution of titanium trichloride. The solution was heated to 40° C. and kept at that temperature for 2 hours. Meanwhile, formation of a purple precipitate of titanium trichloride was observed.

At this point, 1.6 mol of titanium tetrachloride and 0.57 mol of tridecyl methacrylate were added, the temperature raised to 98° C., and the mixture stirred for 2 hours. The precipitate was collected by filtration and repeatedly washed with n-hexane to obtain a solid titanium trichloride catalyst complex as purple fine particles.

(B)

Preparation of Propylene Polymer-Containing Titanium Trichloride

Five liters of purified n-hexane was charged in a 10 l-volume autoclave whose atmosphere had been thoroughly displaced with nitrogen, and 195 g of diethylaluminum chloride and 250 g (reduced amount as $TiCl_3$) of the solid titanium trichloride catalyst complex obtained in (A) above were added thereto. While maintaining the mixture at 60° C., 250 g of propylene gas was blown thereinto over about 60 minutes under stirring to conduct preliminary polymerization.

The system was allowed to stand still to precipitate a solid component, the supernatant removed by decantation, and the solid washed with n-hexane several times to obtain a propylene polymer-containing solid titanium trichloride.

(C)

Preparation of Propylene-Ethylene Block Copolymer

A 1,000 l-volume reaction vessel equipped with a stirrer (first reaction vessel) and a 1,500 l-volume gaseous polymerization vessel of stirring fluidized type (second reaction vessel) were connected in series. In the first reaction vessel, homopolymerization of propylene in liquefied propylene was conducted, and in the second reaction vessel, copolymerization of propylene and ethylene in a gaseous phase was conducted.

To the first reaction vessel were continuously supplied liquefied propylene, 4.0 g/hr of the catalyst component obtained in (B) above, 10 g/hr of diethylaluminum chloride as a co-catalyst, 0.52 g/hr of methyl methacrylate, and 0.15 kg/hr of hydrogen as a molecular weight regulator. The polymerization temperature was set at 70° C., and the average retention time was 3.0 hrs. The resulting propylene polymer had a pore volume of 0.20 cm$^3$/g.

The polymer slurry formed in the first vessel was continuously introduced into the second vessel, where the polymer was subjected to gaseous phase polymerization at a temperature of 60° C. and at a pressure of 15 kg/cm$^2$G. The proportion of propylene to the total amount of ethylene and propylene in the gaseous phase was 65 mol %, and the proportion of hydrogen to the total amount of ethylene and propylene was 15 mol %. The average retention time in the gaseous phase reaction vessel was 2.5 hours.

The polymer continuously withdrawn from the second vessel was separated from the unreacted gases and then treated with vapors of propylene oxide to obtain 45 kg/hr of a propylene-ethylene copolymer powder.

The above-described operation was continued for consecutive 30 days, during which the whole system was stably run. After running for 30 days, the reactors were opened. There was observed neither deposits on the inner wall nor cakes (agglomerates) as in Comparative Example hereinafter described.

The ratio of the homopolymer portion and the copolymer portion in the resulting polymer was 65/35 in average. The powder had a bulk density of 0,.42 g/cm$^3$.

COMPARATIVE EXAMPLE

A propylene-ethylene copolymer was produced in the same manner as in Example 1, except that the preliminary polymerization in step (B) was conducted at 40° C. The propylene polymer formed in the first vessel had a pore volume of 0.12 cm$^3$/g. The operation was continued for 14 days. The resulting copolymer powder had a bulk density as low as 0.26 cm$^3$/g.

After running for 14 days, the reactors were opened. Formation of agglomerates was observed on portions centered at the axis of the stirring blades. Deposits were also observed on the freeboard and the dispersion blade.

It can be seen from these results that control of a pore volume of a propylene homopolymer or copolymer to a specific range brings about great effects in improving powder properties of the resulting propylene copolymer and preventing polymer particles from caking or adhering to the inner wall of the reaction vessel.

EXAMPLE 2

(A)

Preparation of Propylene Polymer-Containing Titanium Trichloride

In a 10 l-volume autoclave whose atmosphere had been thoroughly displaced with nitrogen were charged 5.0 l of purified n-hexane, 195 g of diethylaluminum chloride, and 250 g (reduced amount as TiCl$_3$) of the solid titanium trichloride catalyst complex obtained in Example 1-(A). Into the liquid phase was blown 250 g of propylene gas over about 60 minutes while keeping the mixture at 40° C. under stirring to conduct preliminary polymerization.

The mixture was allowed to stand to precipitate a solid, the supernatant removed by decantation, and the solid collected was washed with n-hexane several times to obtain propylene polymer-containing solid titanium trichloride.

(B)

Contact Treatment with H$_2$O

To an n-hexane slurry of the propylene polymer-containing solid titanium trichloride catalyst component obtained in (A) above was added n-hexane containing 13 ppm of H$_2$O at a H$_2$O/Ti molar ratio of 0.03, followed by thoroughly stirring at room temperature for 1 hour. The TiCl$_3$ concentration in the treating system was 5 g/l.

(C)

Preparation of Propylene-Ethylene Block Copolymer

A 1,000 l-volume reaction vessel equipped with a stirrer (first reaction vessel) and a 1,500 l-volume gaseous polymerization vessel of stirring fluidized type (second reaction vessel) were connected in series. In the first reaction vessel, homopolymerization of propylene in liquefied propylene was conducted, and in the second reaction vessel, copolymerization of propylene and ethylene in a gaseous phase was conducted.

To the first reaction vessel were continuously supplied liquefied propylene, 4.0 g/hr of the catalyst component obtained in (B) above, 10 g/hr of diethylaluminum chloride as a co-catalyst, 0.52 g/hr of methyl methacrylate, and 0.15 kg/hr of hydrogen as a molecular weight regulator. The polymerization temperature was set at 70° C., and the average retention time was 3.0 hrs. The resulting propylene polymer had a pore volume of 0.22 cm$^3$/g.

The polymer slurry formed in the first vessel was continuously introduced into the second vessel, where the polymer was subjected to gaseous phase polymerization at a temperature of 60° C. and at a pressure of 15 kg/cm$^2$G. The proportion of propylene to the total amount of ethylene and propylene in the gaseous phase was 65 mol %, and the proportion of hydrogen to the total amount of ethylene and propylene was 15 mol %. The average retention time in the gaseous phase reaction vessel was 2.5 hours.

The polymer continuously withdrawn from the second vessel was separated from the unreacted gases and then treated with vapors of propylene oxide to obtain 45 kg/hr of a propylene-ethylene copolymer powder.

The above-described operation was continued for 30 days, during which the whole system was stably run. After running for 30 days, the reactors were opened. There was observed neither deposits on the inner wall nor cakes as in Comparative Example.

The resulting polymer comprised of a homopolymer portion and a copolymer portion at a ratio of 70/30 in average. The powder had a bulk density of 0.42 g/cm$^3$.

EXAMPLE 3

A propylene-ethylene copolymer was produced in the same manner as in Example 2, except for replacing H$_2$O treatment with methanol treatment as follows.

To the n-hexane slurry of the propylene polymer-containing solid titanium trichloride catalyst component obtained in Example 2-(A) was added methanol at a molar ratio to Ti of 0.005, followed by thoroughly stirring at room temperature for 1 hour. The $TiCl_3$ concentration in the treating system was 33.2 g/l. The polymer obtained in the first step had a pore volume of 0.24 g/cm$^3$.

The above-described operation was continued for consecutive 30 days in the same manner as in Example 2. The whole polymerization system was run stably. After running for 30 days, the reactors were opened. There was observed no deposition or caking as observed in Comparative Example.

The ratio of the homopolymer portion and the copolymer portion in the resulting polymer was 70/30. The powder had a bulk density of 0.45 g/cm$^3$.

EXAMPLE 4

A propylene-ethylene copolymer was produced in the same manner as in Example 2, except that the solid titanium trichloride catalyst complex was subjected to methanol treatment prior to preliminary polymerization as follows.

To an n-hexane slurry of the solid titanium trichloride catalyst complex as obtained in Example 1-(A) was added methanol at a molar ratio to Ti of 0.001, followed by thoroughly stirring at room temperature for 1 hour. The $TiCl_3$ concentration in the treating system was 5 g/l.

The pore volume of the polymer particles obtained in the first step was 0.20 cm$^3$/g. When the operation was continued for 30 days, the whole system was run stably. After running for 30 days, the reaction vessels were opened. There was observed no deposition or caking as in Comparative Example.

The ratio of the homopolymer portion and the copolymer portion in the resulting polymer was 70/30 in average. The powder had a bulk density of 0.44 g/cm$^3$.

EXAMPLE 5

A propylene-ethylene copolymer was produced in the same manner as in Example 2, except for replacing $H_2O$ treatment with $O_2$ treatment as follows.

To an n-hexane slurry of the propylene polymer-containing solid titanium trichloride catalyst component obtained in Example 2-(A) was added n-heptane saturated with dried air (oxygen concentration: $2.3 \times 10^{-3}$ mol/l) at an oxygen to Ti molar ratio of 0.05, followed by thoroughly stirring at room temperature for 1 hour.

The propylene polymer obtained in the first step had a pore volume of 0.19 cm$^3$.

The above-described operation was continued for 30 days, during which the whole system was stably run. After running for 30 days, the reactors were opened. There was observed neither deposits on the inner wall nor cakes as in Comparative Example.

The ratio of the homopolymer portion and the copolymer portion in the resulting polymer was 70/30 in average. The powder had a bulk density of 0.45 g/cm$^3$.

The reaction conditions and results of the foregoing Examples and Comparative Example are summarized in Table 1 below.

TABLE 1

| | Temp. of Preliminary Polymerization (°C.) | Conditions of Contact Treatment | Pore Volume After First Step (cm$^3$/g) | Bulk Density of Block Copolymer (g/cm$^3$) | Deposition or caking |
|---|---|---|---|---|---|
| Comparative Example | 40 | — | 0.12 | 0.26 | Observed |
| Example 1 | 60 | — | 0.20 | 0.42 | Not observed |
| Example 2 | 40 | After preliminary polymerization ($H_2O$/Ti = 0.01*) | 0.22 | 0.42 | Not observed |
| Example 3 | 40 | After preliminary polymerization (MeOH**/Ti = 0.005*) | 0.24 | 0.45 | Not observed |
| Example 4 | 40 | Before preliminary polymerization (MeOH**/Ti = 0.001*) | 0.20 | 0.44 | Not observed |
| Example 5 | 40 | After preliminary polymerization ($O_2$/Ti = 0.05*) | 0.19 | 0.45 | Not observed |

Note:
*Molar ratio
**MeOH = methanol

As described and demonstrated above, the process of the present invention provides a propylene copolymer excellent in powder properties which causes no obstruction of piping in subsequent steps or caking in a silo, a hopper, etc. The process of the present invention is particularly useful for production of propylene block copolymers in which the amount ratio of the polymer produced in the second step is large, and propylene copolymers having a large α-olefin content, which have conventionally encountered difficulty upon continuous production.

While the invention has been described in detail and with reference to specific examples thereof, it will be apparent to one skilled in the art that various changes and modifications can be made therein without departing from the spirit and scope thereof.

What is claimed is:

1. A process for producing a copolymer of propylene and other α-olefins in the presence of a catalyst comprising a titanium-containing solid catalyst component and an organoaluminum compound, said process comprising (1) a first step in which propylene is homopolymerized or propylene and a minor proportion of other α-olefin are copolymerized to prepare polymer particles having a pore volume of from 0.15 to 0.30 cm$^3$/g, and (2) a second step in which propylene and other α-olefin are copolymerized in the presence of said polymer particles.

2. A process as claimed in claim 1, wherein said titanium-containing solid catalyst component is previously treated with from 0.0001 to 0.1 mol of an active hydrogen compound per mol of titanium.

3. A process as claimed in claim 2, wherein said active hydrogen compound is water or an alcohol.

4. A process as claimed in claim 1, wherein said titanium-containing solid catalyst component is previously treated with from 0.0001 to 0.1 mol of oxygen per mol of titanium.

5. A process as claimed in claim 1, wherein said homopolymerization or copolymerization of propylene in the first step is conducted by using an α-olefin polymer-containing titanium catalyst component obtained by preliminarily polymerizing from 0.1 to 100 g of an α-olefin per gram of the titanium-containing solid catalyst component.

6. A process as claimed in claim 1, wherein in said second step said propylene and other α-olefin in said second step are copolymerized in the presence of said polymer particles in a gaseous phase and in the substantial absence of a liquid phase.

7. A process as claimed in claim 6, wherein said other α-olefin is ethylene.

8. A process as claimed in claim 1, wherein said titanium-containing solid catalyst component has an Al/Ti atomic ratio of not more than 0.15 and contains a complexing agent.

* * * * *